(12) United States Patent
Kim et al.

(10) Patent No.: US 9,638,290 B1
(45) Date of Patent: May 2, 2017

(54) PLANETARY GEAR TRAIN OF AUTOMATIC TRANSMISSION FOR VEHICLE

(71) Applicant: Hyundai Motor Company, Seoul (KR)

(72) Inventors: Jong Soo Kim, Whasung-Si (KR); Sueng Ho Lee, Whasung-Si (KR); Dong Hwan Hwang, Whasung-Si (KR); Seong Wook Hwang, Whasung-Si (KR); Jong Sool Park, Whasung-Si (KR); Seongwook Ji, Whasung-Si (KR); Wonmin Cho, Whasung-Si (KR); Hyun Sik Kwon, Whasung-Si (KR); Kyeong Hun Lee, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/147,349

(22) Filed: May 5, 2016

(30) Foreign Application Priority Data

Oct. 22, 2015 (KR) .......................... 10-2015-0147621

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
CPC .................. F16H 2200/2046; F16H 2200/2012
See application file for complete search history.

(56) References Cited

U.S. PATENT DOCUMENTS

| 2016/0319911 | A1* | 11/2016 | Park | F16H 3/66 |
| 2016/0356351 | A1* | 12/2016 | Lee | F16H 3/66 |
| 2016/0363193 | A1* | 12/2016 | Lee | F16H 3/66 |
| 2016/0369871 | A1* | 12/2016 | Hwang | F16H 3/66 |

FOREIGN PATENT DOCUMENTS

JP          2014-500463 A       1/2014

* cited by examiner

*Primary Examiner* — Derek D Knight
(74) *Attorney, Agent, or Firm* — Morgan, Lewis & Bockius LLP

(57) ABSTRACT

Nine or more forward speeds and at least one reverse speed are achieved by a planetary gear train of an automatic transmission for a vehicle including an input shaft, an output shaft, four planetary gear sets respectively having three rotation elements, and six control elements for selectively interconnecting the rotation elements and a transmission housing.

13 Claims, 2 Drawing Sheets

FIG. 2

| Shift-stage | Control element | | | | | | Gear ratio | Step ratio | Gear ratio span |
|---|---|---|---|---|---|---|---|---|---|
| | C1 | C2 | C3 | B1 | B2 | B3 | | | |
| D1 | | | ● | ● | | ● | 6.047 | 1.621 | 9.598 |
| D2 | | ● | ● | | | ● | 3.730 | 1.621 | |
| D3 | | ● | | ● | | ● | 2.301 | 1.420 | |
| D4 | ● | | | ● | | ● | 1.620 | 1.325 | |
| D5 | ● | ● | | ● | | | 1.223 | 1.223 | |
| D6 | ● | ● | ● | | | | 1.000 | 1.112 | |
| D7 | ● | | ● | ● | | | 0.899 | 1.163 | |
| D8 | ● | | ● | | ● | | 0.773 | 1.227 | |
| D9 | ● | | | ● | ● | | 0.630 | | |
| REV | | | | ● | ● | ● | -3.733 | - | - |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2015-0147621 filed on Oct. 22, 2015, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering hard competition in enhancing fuel consumption of a vehicle.

In this sense, research on an engine has been undertaken to achieve weight reduction and to enhance fuel consumption by so-called downsizing and research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

Considering that gear ratio spans of recently developed eight-speed automatic transmissions are typically between 6.5 and 7.5, fuel consumption enhancement is not very large.

In the case of a gear ratio span of an eight-speed automatic transmission having a level above 9.0, it is difficult to maintain step ratios between adjacent shift stages to be linear, by which driving efficiency of an engine and drivability of a vehicle deteriorated.

Thus, research studies are underway for developing a high efficiency automatic transmission having nine or more speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of, by minimal complexity, realizing at least nine forward speeds and at least one reverse speed, increasing a gear ratio span so as to improve power delivery performance and fuel consumption, and achieving linearity of shift stage step ratios.

An exemplary planetary gear set of an automatic transmission for a vehicle includes an input shaft for receiving an engine torque, an output shaft for outputting a shifted torque, a first planetary gear set having first, second, and third rotational elements, a second planetary gear set having fourth, fifth, and sixth rotational elements, a third planetary gear set having seventh, eighth, and ninth rotational elements, a fourth planetary gear set having tenth, eleventh, and twelfth rotational elements, and six control elements for selectively interconnecting the rotational elements and a transmission housing. The input shaft may be continuously connected with the second rotational element, the output shaft may be continuously connected with the eleventh rotational element, the first rotational element may be continuously connected with the tenth rotational element, the second rotational element may be continuously connected with the sixth rotational element, the fifth rotational element may be continuously connected with the ninth rotational element, the seventh rotational element may be continuously connected with the tenth rotational element, the fourth rotational element may be selectively connectable with the transmission housing, and at least nine forward speeds and at least one reverse speed may be realized by controlling three control elements of the six control elements.

The eighth rotational element may be selectively connectable with the transmission housing, the twelfth rotational element may be selectively connectable with the transmission housing, the third rotational element may be selectively connectable with the output shaft, the eighth rotational element may be selectively connectable with the input shaft, and the first rotational element may be selectively connectable with the fifth rotational element.

the first, second, and third rotational elements of the first planetary gear set may respectively be a sun gear, a planet carrier, and a ring gear of the first planetary gear set, the fourth, fifth, and sixth rotational elements of the second planetary gear set may respectively be a sun gear, a ring gear, and a planet carrier of the second planetary gear set, the seventh, eighth, and ninth rotational elements of the third planetary gear set may respectively be a sun gear, a planet carrier, and a ring gear of the third planetary gear set, and the tenth, eleventh, and twelfth rotational elements of the fourth planetary gear set may respectively be a sun gear, a planet carrier, and a ring gear of the fourth planetary gear set.

A planetary gear train according to an exemplary embodiment of the present invention may realize at least nine forward speeds and at least one reverse speed formed by operating the four planetary gear sets as simple planetary gear sets by controlling six control elements.

In addition, a planetary gear train according to an exemplary embodiment of the present invention may realize a gear ratio span of more than 9.0, thereby maximizing efficiency of driving an engine.

In addition, the linearity of step ratios of shift stages is secured while multi-staging the shift stage with high efficiency, thereby making it possible to improve drivability such as acceleration before and after a shift, an engine speed rhythmic sense, and the like.

Further, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift stages in a planetary gear train according to an exemplary embodiment of the present invention.

Figure 1:
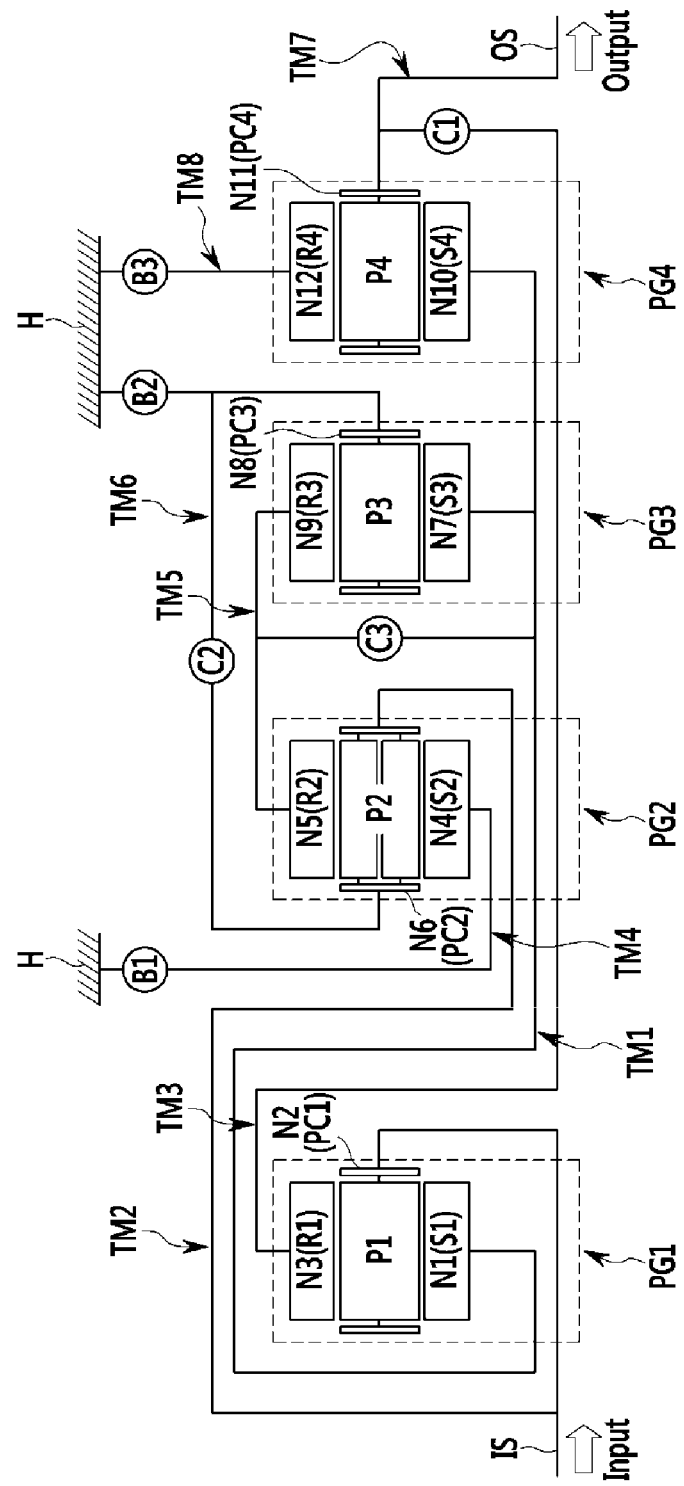
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG, a planetary gear train according to an exemplary embodiment of the present invention includes first, second, third, and fourth planetary gear sets PG1, PG2, PG3, and PG4 arranged on a same axis, an input shaft IS, an output shaft OS, eight connecting members TM1 to TM8 for interconnecting rotational elements of the first, second, third, and fourth planetary gear sets PG1, PG2, PG3, and PG4, six control elements C1 to C3 and B1 to B3, and a transmission housing H.

Torque input from the input shaft IS is shifted by cooperative operation of the first, second, third, and fourth planetary gear sets PG1, PG2, PG3, and PG4, and then output through the output shaft OS.

The simple planetary gear sets second, third and fourth planetary gear sets PG1, PG2, PG3 and PG4 are arranged in the order of first, second, third and fourth planetary gear sets PG1, PG2, PG3 and PG4, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a single pinion planetary gear set, and includes a first sun gear S1, a first planet carrier PC1 that supports a first pinion P1 externally engaged with the first sun gear S1, and a first ring gear R1 internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a double pinion planetary gear set, and includes a second sun gear S2, a second planet carrier PC2 that supports a second pinion P2 externally engaged with the second sun gear S2, and a second ring gear R2 internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinion P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, third, and fourth planetary gear sets PG1, PG2, PG3, and PG4, the first rotational element N1 is directly connected with the seventh rotational element N7 and the tenth rotational element N10, the second rotational element N2 is directly connected with the sixth rotational element N6, the fifth rotational element N5 is directly connected with the ninth rotational element N9, by eight connecting members TM1 to TM8.

The eight connecting members TM1 to TM8 are arranged as follows.

The first connecting member TM1 is connected with the first rotational element N1 (first sun gear S1), the seventh rotational element N7 (third sun gear S3), and the tenth rotational element N10 (fourth sun gear S4).

The second connecting member TM2 is connected with the second rotational element N2 (first planet carrier PC1) and the sixth rotational element N6 (second planet carrier PC2), and directly connected with the input shaft IS, thereby continuously acting as an input element.

The third connecting member TM3 is connected with third rotational element N3 (first ring gear R1).

The fourth connecting member TM4 is connected with the fourth rotational element N4 (second sun gear S2), and selectively connectable with the transmission housing H.

The fifth connecting member TM5 is connected with the fifth rotational element N5 (second ring gear R2) and the ninth rotational element N9 (third ring gear R3), and selectively connectable with the first connecting member TM1.

The sixth connecting member TM6 is connected with the eighth rotational element N8 (third planet carrier PC3), selectively connectable the second connecting member TM2, and selectively connectable with the transmission housing H.

The seventh connecting member TM7 is connected with the eleventh rotational element N11 (fourth planet carrier PC4), selectively connectable with the third connecting member TM3, and directly connected with the output shaft OS, thereby continuously acting as an output element.

The eighth connecting member TM8 is connect with the twelfth rotational element N12 (fourth ring gear R4), and selectively connectable with the transmission housing H.

The connecting members TM1 to TM8 may be selectively interconnected with one another by control elements of three clutches C1, C2, and C3.

The connecting members TM1 to TM8 may be selectively connectable with the transmission housing H, by control elements of three brakes B1, B2, and B3.

The six control elements C1 to C3 and B1 to B3 are arranged as follows.

The first clutch C1 is arranged between the third connecting member TM3 and the seventh connecting member TM7, such that the third connecting member TM3 and the seventh connecting member TM7 may selectively become integral.

The second clutch C2 is arranged between the second connecting member TM2 and the sixth connecting member TM6, such that the second connecting member TM2 and the sixth connecting member TM6 may selectively become integral.

The third clutch C3 is arranged between the first connecting member TM1 and the fifth connecting member TM5, such that the first connecting member TM1 and the fifth connecting member TM5 may selectively become integral.

The first brake B1 is arranged between the fourth connecting member TM4 and the transmission housing H, such that the fourth connecting member TM4 may selectively act as a fixed element.

The second brake B2 is arranged between the sixth connecting member TM6 and the transmission housing H, such that the sixth connecting member TM6 may selectively act as a fixed element.

The third brake B3 is arranged between the eighth connecting member TM8 and the transmission housing H, such that the eighth connecting member TM8 may selectively act as a fixed element.

The control elements of the first, second, and third clutches C1, C2, and C3 and the first, second, and third brakes B1, B2, and B3 may be realized as multi-plate hydraulic pressure friction devices that are frictionally engaged by hydraulic pressure.

FIG. 2 is an operational chart for respective control elements at respective shift stages in a planetary gear train according to an exemplary embodiment of the present invention.

As shown in FIG. 2, a planetary gear train according to an exemplary embodiment of the present invention performs shifting by operating three control elements at respective shift stages.

In the forward first speed D1, the third clutch C3 and the first and third brakes B1 and B3 are simultaneously operated. As a result, while the first connecting member TM1 is interconnected with the fifth connecting member TM5 by the operation of the third clutch C3, torque is input to the second connecting member TM2. The fourth connecting member TM4 and the eighth connecting member TM8 act as fixed elements by the operation of the first and third brakes B1 and B3, thereby realizing the forward first speed and outputting a shifted torque through the output shaft OS connected with the seventh connecting member TM7.

In the forward second speed D2, the second and third clutches C2 and C3 and the third brake B3 are simultaneously operated. As a result, the second connecting member TM2 is interconnected with the sixth connecting member TM6 by the operation of the second clutch C2, and the first connecting member TM1 is interconnected with the fifth connecting member TM5 by the operation of the third clutch C3. In this state, torque is input to the second connecting member TM2. In addition, the eighth connecting member TM8 acts as a fixed element by the operation of the third brake B3, thereby realizing the forward second speed and outputting a shifted torque through the output shaft OS connected with the seventh connecting member TM7.

In the forward third speed D3, the second clutch C2 and the first and third brakes B1 and B3 are simultaneously operated. As a result, while the second connecting member TM2 is interconnected with the sixth connecting member TM6 by the operation of the second clutch C2, torque is input to the second connecting member TM2. The fourth connecting member TM4 and the eighth connecting member TM8 act as fixed elements by the operation of the first and third brakes B1 and B3, thereby realizing the forward third speed and outputting a shifted torque through the output shaft OS connected with the seventh connecting member TM7.

In the forward fourth speed D4, the first clutch C1 and the first and third brakes B1 and B3 are simultaneously operated. As a result, while the third connecting member TM3 is interconnected with the seventh connecting member TM7 by the operation of the first clutch C1, torque is input to the second connecting member TM2. The fourth connecting member TM4 and the eighth connecting member TM8 act as fixed elements by the operation of the first and third brakes B1 and B3, thereby realizing the forward fourth speed and outputting a shifted torque through the output shaft OS connected with the seventh connecting member TM7.

In the forward fifth speed D5, the first and second clutches C1 and C2 and the first brake B1 are simultaneously operated. As a result, the third connecting member TM3 is interconnected with the seventh connecting member TM7 by the operation of the first clutch C1, and the second connecting member TM2 is interconnected with the sixth connecting member TM6 by the operation of the second clutch C2. In this state, torque is input to the third connecting member TM3. In addition, the fourth connecting member TM4 acts as a fixed element by the operation of the first brake B1, thereby realizing the forward fifth speed and outputting a shifted torque through the output shaft OS connected with the seventh connecting member TM7.

In the forward sixth speed D6, the first, second, and third clutches C1, C2, and C3 are simultaneously operated. As a result, the third connecting member TM3 is interconnected with the seventh connecting member TM7 by the operation of the first clutch C1, the second connecting member TM2 is interconnected with the sixth connecting member TM6 by the operation of the second clutch C2, and the first connecting member TM1 is interconnected with the fifth connecting member TM5 by the operation of the third clutch C3. Therefore, the first, second, third, and fourth planetary gear sets PG1, PG2, PG3, and PG4 becomes integral as a whole, thereby realizing the forward sixth speed and outputting a shifted torque exactly as inputted, through the output shaft OS connected with the seventh connecting member TM7.

In the forward seventh speed D7, the first and third clutches C1 and C3 and the first brake B1 are simultaneously operated. As a result, the third connecting member TM3 is interconnected with the seventh connecting member TM7 by the operation of the first clutch C1, and the first connecting member TM1 is interconnected with the fifth connecting member TM5 by the operation of the third clutch C3. In this state, torque is input to the third connecting member TM3. In addition, the fourth connecting member TM4 acts as a fixed element by the operation of the first brake B1, thereby realizing the forward seventh speed and outputting a shifted torque through the output shaft OS connected with the seventh connecting member TM7.

In the forward eighth speed D8, the first and third clutches C1 and C3 and the second brake B2 are simultaneously operated. As a result, the third connecting member TM3 is interconnected with the seventh connecting member TM7 by the operation of the first clutch C1, and the first connecting member TM1 is interconnected with the fifth connecting member TM5 by the operation of the third clutch C3. In this state, torque is input to the third connecting member TM3. In addition, the sixth connecting member TM6 acts as a fixed element by the operation of the second brake B2, thereby realizing the forward eighth speed and outputting a shifted torque through the output shaft OS connected with the seventh connecting member TM7.

In the forward ninth speed D9, the first clutch C1 and the first and second brakes B1 and B2 are simultaneously operated. As a result, while the third connecting member TM3 is interconnected with the seventh connecting member TM7 by the operation of the first clutch C1, torque is input to the second connecting member TM2. The fourth connecting member TM4 and the sixth connecting member TM6 act as fixed elements by the operation of the first and second brakes B1 and B2, thereby realizing the forward ninth speed and outputting a shifted torque through the output shaft OS connected with the seventh connecting member TM7.

In the reverse speed REV, the first, second, and third brakes B1, B2, and B3 are simultaneously operated. As a result, torque is input to the second connecting member TM2, and the fourth connecting member TM4, the sixth connecting member TM6, and the eighth connecting member TM8 act as fixed elements by the operation of the first, second, and third brakes B1, B2, and B3, thereby realizing the reverse speed and outputting a shifted torque through the output shaft OS connected with the seventh connecting member TM7.

As described above, a planetary gear train according to an exemplary embodiment of the present invention may realize at least nine forward speeds and at least one reverse speed formed by operating the four planetary gear sets PG1, PG2, PG3, and PG4 by controlling the three clutches C1, C2, and C3 and the three brakes B1, B2, and B3.

In addition, a planetary gear train according to an exemplary embodiment of the present invention may realize a gear ratio span of more than 9.0, thereby maximizing efficiency of driving an engine.

Furthermore, a planetary gear train according to an exemplary embodiment of the present invention may achieve step ratios of more than 1.2 for all shifting except for forward 6/7 and 7/8 shifting and realize linearity of step ratios, thereby improving drivability, e.g., acceleration quality before after a shifting and engine speed rhythm.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear set of an automatic transmission for a vehicle, comprising:
   an input shaft configured for receiving an engine torque;
   an output shaft configured for outputting a shifted torque;
   a first planetary gear set having first, second, and third rotation elements;
   a second planetary gear set having fourth, fifth, and sixth rotation elements;
   a third planetary gear set having seventh, eighth, and ninth rotation elements;
   a fourth planetary gear set having tenth, eleventh, and twelfth rotation elements; and
   six control elements for selectively interconnecting the first, second, third, fourth, fifth, sixth, seventh, eighth, ninth, tenth, eleventh, and twelfth rotation elements and a transmission housing,
   wherein the input shaft is continuously connected with the second rotation element,
   the output shaft is continuously connected with the eleventh rotation element,
   the first rotation element is continuously connected with the tenth rotation element,
   the second rotation element is continuously connected with the sixth rotation element,
   the fifth rotation element is continuously connected with the ninth rotation element,
   the seventh rotation element is continuously connected with the tenth rotation element,
   the fourth rotation element is selectively connectable with the transmission housing, and
   at least nine forward speeds and at least one reverse speed is realized by controlling three control elements of the six control elements.

2. The planetary gear train of claim 1, wherein
   the eighth rotation element is selectively connectable with the transmission housing;
   the twelfth rotation element is selectively connectable with the transmission housing;
   the third rotation element is selectively connectable with the output shaft;
   the eighth rotation element is selectively connectable with the input shaft; and
   the first rotation element is selectively connectable with the fifth rotation element.

3. The planetary gear train of claim 1, wherein
the first, second, and third rotation elements of the first planetary gear set are respectively a sun gear, a planet carrier, and a ring gear of the first planetary gear set;
the fourth, fifth, and sixth rotation elements of the second planetary gear set are respectively a sun gear, a ring gear, and a planet carrier of the second planetary gear set;
the seventh, eighth, and ninth rotation elements of the third planetary gear set are respectively a sun gear, a planet carrier, and a ring gear of the third planetary gear set; and
the tenth, eleventh, and twelfth rotation elements of the fourth planetary gear set are respectively a sun gear, a planet carrier, and a ring gear of the fourth planetary gear set.

4. A planetary gear set of an automatic transmission for a vehicle, comprising:
an input shaft configured for receiving an engine torque;
an output shaft configured for outputting a shifted torque;
a first planetary gear set having first, second, and third rotation elements;
a second planetary gear set having fourth, fifth, and sixth rotation elements;
a third planetary gear set having seventh, eighth, and ninth rotation elements;
a fourth planetary gear set having tenth, eleventh, and twelfth rotation elements; and
six control elements for selectively interconnecting the first, second, third, fourth, fifth, sixth, seventh, eighth, ninth, tenth, eleventh, and twelfth rotation elements and a transmission housing,
a first connecting member connected with the first rotation element, the seventh rotation element, and the tenth rotation element;
a second connecting member connected with the second rotation element and the sixth rotation element and directly connected with the input shaft;
a third connecting member connected with the third rotation element;
a fourth connecting member connected with the fourth rotation element and selectively connectable with the transmission housing;
a fifth connecting member connected with the fifth rotation element and the ninth rotation element and selectively connectable with the first connecting member;
a sixth connecting member connected with the eighth rotation element, selectively connectable with the second connecting member, and selectively connectable with the transmission housing;
a seventh connecting member connected with the eleventh rotation element, selectively connectable with the third connecting member, and directly connected with the output shaft; and
an eighth connecting member connected with the twelfth rotation element and selectively connectable with the transmission housing.

5. The planetary gear train of claim 4, wherein
the first planetary gear set is a single pinion planetary gear set, where the first rotation element is a first sun gear, the second rotation element is a first planet carrier, and the third rotation element is a first ring gear;
the second planetary gear set is a double pinion planetary gear set, where the fourth rotation element is a second sun gear, the fifth rotation element is a second ring gear, and the sixth rotation element is a second planet carrier;
the third planetary gear set is a single pinion planetary gear set, where the seventh rotation element is a third sun gear, the eighth rotation element is a third planet carrier, and the ninth rotation element is a third ring gear; and
the fourth planetary gear set is a single pinion planetary gear set, where the tenth rotation element is a fourth sun gear, the eleventh rotation element is a fourth planet carrier, and the twelfth rotation element is a fourth ring gear.

6. The planetary gear train of claim 4, wherein the six control elements comprise:
a first clutch selectively connecting the third connecting member and the seventh connecting member;
a second clutch selectively connecting the second connecting member and the sixth connecting member;
a third clutch selectively connecting the first connecting member and the fifth connecting member;
a first brake selectively connectable the fourth connecting member and the transmission housing;
a second brake selectively connectable the sixth connecting member and the transmission housing; and
a third brake selectively connectable the eighth connecting member and the transmission housing.

7. The planetary gear train of claim 6, wherein shift stages realized by selective operation of the six control elements comprise:
a forward first speed formed by simultaneous operation of the third clutch and the first and third brakes;
a forward second speed formed by simultaneous operation of the second and third clutches and the third brake;
a forward third speed formed by simultaneous operation of the second clutch and the first and third brakes;
a forward fourth speed formed by simultaneous operation of the first clutch and the first and third brakes;
a forward fifth speed formed by simultaneous operation of the first clutch and second clutch and the first brake;
a forward sixth speed formed by simultaneous operation of the first, second, and third clutches;
a forward seventh speed formed by simultaneous operation of the first and third clutches and the first brake;
a forward eighth speed formed by simultaneous operation of the first and third clutches and the second brake;
a forward ninth speed formed by simultaneous operation of the first clutch and the first and second brakes; and
a reverse speed formed by simultaneous operation of the first, second, and third brakes.

8. A planetary gear set of an automatic transmission for a vehicle, comprising:
an input shaft configured for receiving an engine torque;
an output shaft configured for outputting a shifted torque;
a first planetary gear set as a single pinion planetary gear set having first, second, and third rotation elements;
a second planetary gear set as a double pinion planetary gear set having fourth, fifth, and sixth rotation elements;
a third planetary gear set as a single pinion planetary gear set having seventh, eighth, and ninth rotation elements;
a fourth planetary gear set as a single pinion planetary gear set having tenth, eleventh, and twelfth rotation elements;
a first connecting member connected with the first rotation element, the seventh rotation element, and the tenth rotation element;
a second connecting member connected with the second rotation element and the sixth rotation element and directly connected with the input shaft;

a third connecting member connected with the third rotation element;
a fourth connecting member connected with the fourth rotation element and selectively connectable with the transmission housing;
a fifth connecting member connected with the fifth rotation element and the ninth rotation element and selectively connectable with the first connecting member;
a sixth connecting member connected with the eighth rotation element, selectively connectable with the second connecting member, and selectively connectable with the transmission housing;
a seventh connecting member connected with the eleventh rotation element, selectively connectable with the third connecting member, and directly connected with the output shaft;
an eighth connecting member connected with the twelfth rotation element and selectively connectable with the transmission housing;
a first clutch selectively connecting the third connecting member and the seventh connecting member;
a second clutch selectively connecting the second connecting member and the sixth connecting member;
a third clutch selectively connecting the first connecting member and the fifth connecting member;
a first brake selectively connectable the fourth connecting member and the transmission housing;
a second brake selectively connectable the sixth connecting member and the transmission housing; and
a third brake selectively connectable the eighth connecting member and the transmission housing.

9. The planetary gear train of claim 8, wherein
the first planetary gear set includes a first sun gear as the first rotation element, a first planet carrier as the second rotation element, and a first ring gear as the third rotation element;
the second planetary gear set includes a second sun gear as the fourth rotation element, a second ring gear as the fifth rotation element, and a second planet carrier as the sixth rotation element;
the third planetary gear set includes a third sun gear as the seventh rotation element, a third planet carrier as the eighth rotation element, and a third ring gear as the ninth rotation element;
the fourth planetary gear set includes a fourth sun gear as the tenth rotation element, a fourth planet carrier as the eleventh rotation element, and a fourth ring gear as the twelfth rotation element.

10. The planetary gear train of claim 8, wherein shift stages realized by selective operation of the three clutches and the three brakes comprise:
a forward first speed formed by simultaneous operation of the third clutch and the first and third brakes;
a forward second speed formed by simultaneous operation of the second and third clutches and the third brake;
a forward third speed formed by simultaneous operation of the second clutch and the first and third brakes;
a forward fourth speed formed by simultaneous operation of the first clutch and the first and third brakes;
a forward fifth speed formed by simultaneous operation of the first clutch and second clutch and the first brake;
a forward sixth speed formed by simultaneous operation of the first, second, and third clutches;
a forward seventh speed formed by simultaneous operation of the first and third clutches and the first brake;
a forward eighth speed formed by simultaneous operation of the first and third clutches and the second brake;
a forward ninth speed formed by simultaneous operation of the first clutch and the first and second brakes; and
a reverse speed formed by simultaneous operation of the first, second, and third brakes.

11. A planetary gear set of an automatic transmission for a vehicle, comprising:
an input shaft configured for receiving an engine torque;
an output shaft configured for outputting a shifted torque;
a first planetary gear set as a single pinion planetary gear set having a first sun gear, a first planet carrier, and a first ring gear;
a second planetary gear set as a double pinion planetary gear set having a second sun gear, a second planet carrier, and a second ring gear;
a third planetary gear set as a single pinion planetary gear set having a third sun gear, a third planet carrier, and a third ring gear;
a fourth planetary gear set as a single pinion planetary gear set having a fourth sun gear, a fourth planet carrier, and a fourth ring gear;
a first connecting member connected with the first sun gear, the third sun gear, and the fourth sun gear;
a second connecting member connected with the first planet carrier and the second planet carrier and directly connected with the input shaft;
a third connecting member connected with the first ring gear;
a fourth connecting member connected with the second sun gear and selectively connectable with the transmission housing;
a fifth connecting member connected with the second ring gear and the third ring gear and selectively connectable with the first connecting member;
a sixth connecting member connected with the third planet carrier, selectively connectable with the second connecting member, and selectively connectable with the transmission housing;
a seventh connecting member connected with the fourth planet carrier, selectively connectable with the third connecting member, and directly connected with the output shaft;
an eighth connecting member connected with the fourth ring gear and selectively connectable with the transmission housing; and
six control elements selectively connecting the first, second, third, fourth, fifth, sixth, seventh, and eighth connecting members and the transmission housing.

12. The planetary gear train of claim 11, wherein the six control elements comprise:
a first clutch selectively connecting the third connecting member and the seventh connecting member;
a second clutch selectively connecting the second connecting member and the sixth connecting member;
a third clutch selectively connecting the first connecting member and the fifth connecting member;
a first brake selectively connectable the fourth connecting member and the transmission housing;
a second brake selectively connectable the sixth connecting member and the transmission housing; and
a third brake selectively connectable the eighth connecting member and the transmission housing.

13. The planetary gear train of claim 12, wherein shift stages realized by selective operation of the six control elements comprise:
a forward first speed formed by simultaneous operation of the third clutch and the first and third brakes;

a forward second speed formed by simultaneous operation of the second and third clutches and the third brake;
a forward third speed formed by simultaneous operation of the second clutch and the first and third brakes;
a forward fourth speed formed by simultaneous operation of the first clutch and the first and third brakes;
a forward fifth speed formed by simultaneous operation of the first clutch and second clutch and the first brake;
a forward sixth speed formed by simultaneous operation of the first, second, and third clutches;
a forward seventh speed formed by simultaneous operation of the first and third clutches and the first brake;
a forward eighth speed formed by simultaneous operation of the first and third clutches and the second brake;
a forward ninth speed formed by simultaneous operation of the first clutch and the first and second brakes; and
a reverse speed formed by simultaneous operation of the first, second, and third brakes.

\* \* \* \* \*